(12) United States Patent
Falbo (10) Patent No.: US 10,183,461 B2
(45) Date of Patent: Jan. 22, 2019

(54) MULTIPURPOSE SEGMENTED TURNING SEGMENTS AND RINGS

(71) Applicant: Vincent Anthony Falbo, Pen Creek Drive, NY (US)

(72) Inventor: Vincent Anthony Falbo, Pen Creek Drive, NY (US)

( * ) Notice: Subject to any disclaimer, the term of this patent is extended or adjusted under 35 U.S.C. 154(b) by 2 days.

(21) Appl. No.: 15/372,529

(22) Filed: Dec. 8, 2016

(65) Prior Publication Data

US 2018/0162088 A1    Jun. 14, 2018

(51) Int. Cl.
| | |
|---|---|
| *B32B 3/18* | (2006.01) |
| *B32B 21/13* | (2006.01) |
| *B32B 3/26* | (2006.01) |
| *B32B 3/14* | (2006.01) |
| *B27D 1/00* | (2006.01) |
| *E04H 12/02* | (2006.01) |
| *B27C 7/00* | (2006.01) |

(52) U.S. Cl.
CPC ............... *B32B 3/18* (2013.01); *B27D 1/00* (2013.01); *B32B 3/14* (2013.01); *B32B 3/266* (2013.01); *B32B 21/13* (2013.01); *E04H 12/02* (2013.01); *B27C 7/00* (2013.01); *B32B 2597/00* (2013.01); *Y10T 428/13* (2015.01)

(58) Field of Classification Search
CPC .................................................... Y10T 428/13
See application file for complete search history.

(56) References Cited

U.S. PATENT DOCUMENTS

| | | | |
|---|---|---|---|
| 730,789 | A | 6/1903 | Neill |
| 2,062,175 | A | 11/1938 | Hartman |
| 3,153,433 | A | 10/1964 | Ferrara |
| 3,788,372 | A | 1/1974 | Terenzoni |
| 4,522,006 | A | 6/1985 | Plikuhn |

OTHER PUBLICATIONS

Segmented Turning: A Practical Guide, Dennis Keeling, 2012.*
Lumberjocks, "New Method Open Segment Turning Construction", Oct. 2009, pp. 1, 2 and 7.*
"Anasazi Bowl Klt", archived Dec. 2012, [on line], Retrieved from Archive.org on Jul. 18, 2018 https://web.archive.org/web/20121201000000*/http://www.bowlkitco.com/anasazi-bowl-kit.*

* cited by examiner

*Primary Examiner* — Alexander S Thomas
(74) *Attorney, Agent, or Firm* — Woods Oviatt Gilman LLP; Dennis B. Danella, Esq.; Douglas R. Smith, Esq.

(57) ABSTRACT

A turning assembly used to form at least a portion of a turned object comprises a plurality of prism block segments. The outer face includes a width that is greater than a width of the inner face. A radial central axis extends between and is perpendicular to the outer face and the inner face and has a length greater than the width of the inner face. A first set of block segments is arranged in a side-to-side orientation to form a first turning blank with the outer faces generally forming a regular polygon. A second set of block segments is arranged in a side-to-side orientation to form a second turning blank with the outer faces generally forming a regular polygon. The first turning blank is coupled to the second turning blank to form a coupled turning blank that is formed into the portion of the turned object.

26 Claims, 7 Drawing Sheets

MULTIPURPOSE SEGMENTED TURNING SEGMENTS AND RINGS

FIELD OF THE INVENTION

The present invention relates to woodturning; and more particularly, to woodturning of segmented turning blanks; and most particularly to turning blanks comprising a plurality of uniform turning segments formed into a uniform turning assembly used to form at least a portion of a turned object, and a method of use thereof.

BACKGROUND OF THE INVENTION

Woodturning is an art form and industrial process that requires the use of various cutting tools to shape wood mounted and rotating on an axis. Segmented woodturning involves using segments of wood assembled in a manner that allows the construction of various objects, e.g. bowls, vases, urns, spindles, and platters. For segmented woodturning, each segment is generally formed into a triangular or trapezoidal prism with multiple prisms then being assembled together to construct turning blanks shaped as polygonal prisms with n sides. Turning rings may further include a central hole having n sides. A plurality of turning blanks and/or rings may then be coupled together to form a joined turning blank, with multiple joined turning blanks stacked upon and coupled to one another to form an object blank from which is turned the desired object.

To successfully turn a segmented object, a number of technical challenges involved in the process must be addressed. Initially, designing an object requires precise calculations to determine the diameter at many different locations along the central turning axis along with precise geometry of the segments that will construct the individual rings so that there are no gaps where the segments mate. Designing an object also requires precise calculations for the thickness of each ring that will be a component in the final piece. Even potentially more challenging is fabricating the multiple individual segments which will be joined together. Fabrication may require using various machines, with each machine calibrated with very small tolerances for error. Poorly calibrated or improperly set up equipment may lead to unwanted gaps between mated segments. In view of these above difficulties, current solutions and procedures focus on the design of rings to construct only one specific object.

Therefore, there is a need for a system and method for turning segmented objects whereby an assembly includes segments which have been precisely designed and fabricated. Moreover, the dimensions of the block segments may also allow these segments to form blanks which may be used in the construction of several different objects wherein each blank may be turned over a wide range of internal and external diameters. The present invention addresses these, as well as other, needs.

BRIEF SUMMARY OF THE INVENTION

It is, therefore, an aspect of the present invention to provide a uniform turning assembly used to form at least a portion of a turned object. The assembly comprises a plurality of interchangeable block segments, each block segment comprising an isosceles prism including an outer face, an inner face, opposing first and second side faces extending between the outer face and inner face, a top face and a bottom face. The outer face includes a width that is greater than a width of the inner face and each block segment includes a radial central axis that extends between the outer face and the inner face. The central axis is perpendicular to the outer face and the inner face and a length of the central axis is greater than the width of the inner face. A first set of interchangeable block segments is arranged with the first side face of a first respective block segment arranged adjacent to the second side face of a second respective block segment in a side-by-side orientation whereby successive block segments form a first turning blank with the outer faces of the arranged block segments generally forming a regular polygon. A second set of interchangeable block segments is arranged with the first side face of a third respective block segment arranged adjacent to the second side face of a fourth respective block segment in a side-by-side orientation whereby successive block segments form a second turning blank with the outer faces of the arranged block segments generally forming a regular polygon. At least a portion of the top face of the first turning blank is configured to be coupled to at least a portion of the bottom face of the second turning blank to form a coupled turning blank that is configured to be formed into the portion of the turned object.

In a further aspect of the present invention, a method for forming a uniform turning assembly used to form at least a portion of a turned object is provided. The method comprises a) providing a plurality of interchangeable block segments, each block segment comprising an isosceles prism including an outer face, an inner face, opposing first and second side faces extending between the outer face and inner face, a top face and a bottom face, wherein the outer face includes a width that is greater than a width of the inner face, and wherein each of the plurality of interchangeable block segments include a radial central axis that extends between the outer face and the inner face, wherein the central axis is perpendicular to the outer face and the inner face, and wherein a length of the central axis is greater than the width of the inner face; b) arranging a first set of interchangeable block segments from the plurality of interchangeable block segments to form a first turning blank with the outer faces of the arranged first set of interchangeable block segments generally forming a regular polygon, wherein the first side face of each of the block segments in the first set of interchangeable block segments is arranged adjacent to the second side face of another block segment in the first set of interchangeable block segments in a side-by-side orientation; c) arranging a second set of interchangeable block segments from the plurality of interchangeable block segments to form a second turning blank with the outer faces of the arranged second set of interchangeable block segments generally forming a regular polygon, wherein the first side face of each of the block segments in the first set of interchangeable block segments is arranged adjacent to the second side face of another block segment in the first set of interchangeable block segments in a side-by-side orientation; and d) coupling the top face of the first turning blank to the bottom face of the second turning blank to form a coupled turning blank that is configured to be formed into a portion of the turned object.

In still another aspect of the present invention, a method for forming a uniform turning assembly used to form at least a portion of a turned object is provided. The method comprises a) providing a plurality of interchangeable block segments, each block segment comprising an isosceles prism including an outer face, an inner face, opposing first and second side faces extending between the outer face and inner face, a top face and a bottom face, wherein the outer face includes a width that is greater than a width of the inner face, and wherein each of the plurality of interchangeable block segments include a radial central axis that extends between the outer face and the inner face, wherein the central axis is perpendicular to the outer face and the inner face, and wherein a length of the central axis is greater than the width of the inner face; b) providing a plurality of segment spacers, wherein each segment spacer is a rectangular prism having a length equal to a length of the first inner face of each of the plurality of interchangeable block segments; c) arranging a first set of interchangeable block segments from the plurality of interchangeable block segments to form a first turning blank, wherein the outer faces of the arranged first set of interchangeable block segments generally form a regular polygon; d) arranging a second set of interchangeable block segments from the plurality of interchangeable block segments to form a second turning blank, wherein the outer faces of the arranged second set of interchangeable block segments generally form a regular polygon; e) disposing a respective segment spacer between adjacent block segments in one or both of the first set of interchangeable block segments and the second set of interchangeable block segments to form a respective first and/or second expanded turning blank; and f) coupling the top face of the first turning blank to the bottom face of the second turning blank to form a coupled turning blank that is configured to be formed into a portion of the turned object.

In still a further aspect of the method of the present invention, a solid base may be coupled to the bottom face of the first turning blank or each of the inner faces of the interchangeable block segments within the first set may be configured to include a rabbet wherein upon coupling of the first set of block segments to form the first turning blank, the rabbets form a rabbeted recess. A floating base may then be coupled within the rabbeted recess, and the first turning ring may further include a retaining ring coupled to the inner face of the first turning blank to floatingly secure the floating base to the first turning blank.

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
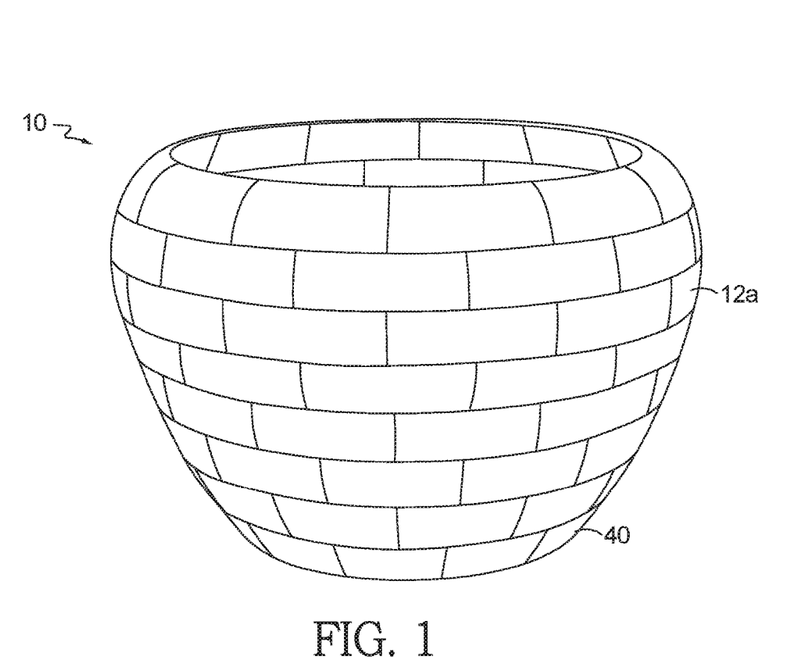
FIG. 1 is a perspective view of an object created using a uniform turning assembly of the present invention.
Figure 2:
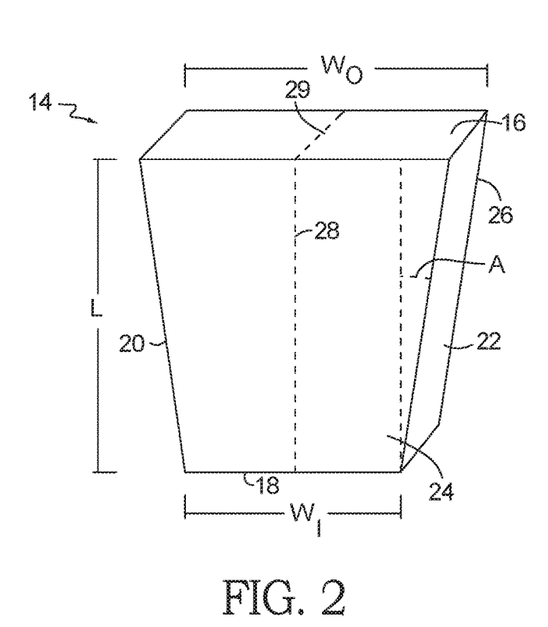
FIG. 2 is perspective view of an individual block segment of a uniform turning assembly in accordance with the present invention.
Figure 3:
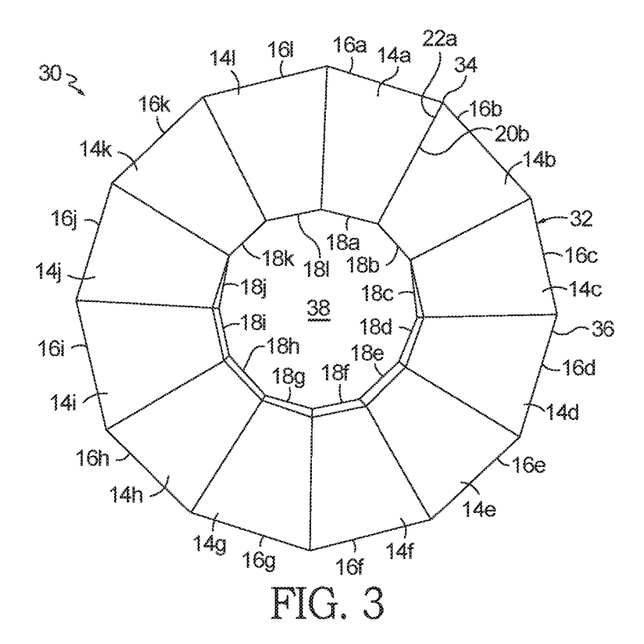
FIG. 3 is a top perspective view of a turning ring of a uniform turning assembly in accordance with an aspect of the present invention.

With reference to FIGS. 1 through 6, a uniform turning assembly 10 which may be used to create a turned object, such as a bowl 12a-12c, is disclosed. With reference to FIGS. 2 and 3, turning assembly 10 may be comprised of a plurality of interchangeable block segments 14 formed generally as isosceles prisms. For sake of clarity, the term "isosceles prism" may encompass isosceles triangular prisms and isosceles trapezoidal prisms, with other geometries to be considered within the teachings of the present invention. Without limiting solely thereto, the below discussion and referenced drawings may be generally directed to isosceles trapezoidal prisms with an understanding by those skilled in the art that such discussion may apply to other isosceles prisms and that such is to be considered within the teachings of the present invention.

As shown in FIG. 2, each block segment 14 may include an outer face 16, an inner face 18, opposing first 20 and second 22 side faces extending between outer face 16 and inner face 18, a top face 24 and a bottom face 26. Outer face 16 has a width $W_O$ that is greater than the width $W_I$ of inner face 18. Each block segment 14 may also include a radially extending central axis 28 that extends between outer face 16 and inner face 18. Central axis 28 is perpendicular to outer face 16 and inner face 18 wherein the length L of central axis 28 is greater than width $W_I$ of inner face 18. It should be further noticed that, in another aspect of the invention, length L of central axis 28 may also be greater than width $W_O$ of outer face 16. A midline 29 may also be defined on outer face 16 wherein midline 29 segregates outer face 16 into two equal regions having a width equal to $W_O/2$. Each block segment 14 may include a thickness T which may vary subject to a turner's desire. Typically, and without limiting thereto, block thickness T may be selected to be 0.25, 0.5 or 0.75 inches although other thicknesses may be used and are to be considered within the scope of the present invention.

With reference to FIG. 3, one aspect of the uniform turning assembly of the present invention includes the provision of a set 30 of interchangeable block segments 14a-14l that may be configured to form a contiguous turning blank 32. When forming contiguous turning blank 32, first side edge 20b of block segment 14b is arranged adjacent to second side edge 22a of block segment 14a in a side-by-side orientation along joint 34. As shown in FIG. 3, successive block segments 14a-14l may be directly coupled to one another whereby outer faces 16a-16l of the arranged block segments 14a-14l may collectively generally form a contiguous regular polygon.

To that end, miter angle A of first 20 and second 22 side faces (see FIG. 2) is dependent upon the number of block segments 14 which comprises contiguous turning blank 32. Accordingly, angle A may be calculated using formula (1):

$$A=360°/(2\times N) \qquad (1)$$

where N is the number of block segments 14 comprising contiguous turning blank 32. By way of example, and as shown in FIG. 3, a contiguous turning blank 32 may be formed of twelve (12) block segments 14. Using formula (1), angle A is calculated to be 15° (i.e. 360°/(2×12)=15°) and the regular polygon formed by the arranged block segments 14 is a regular dodecahedron. Without limitation solely thereto, other common shapes of contiguous turning blank 32 may be a square (N=4, A=45°), a hexagon (N=6, A=30°), an octagon (N=8, A=22.5°) and a hexadecagon (N=16, A=11.25°).

As shown in FIG. 3, block segments 14a-14l may comprise trapezoidal isosceles prisms which include an inner face 18a-18l each having a common width $W_I$ whereby assembled block segments form a turning ring 36 having a central opening 38. However, it should be noted that block segments 14a-14l may be generally shaped as isosceles triangular prisms and include inner faces 18a-18l that have a nominal width $W_I$, such as less than about one-sixteenth (0.0625) inch, whereby an assembled turning blank would be a substantially closed polygon with no (or very small) central opening 38 (i.e. an opening having a diameter less than about one-eighth (0.125) inch.

Figure 4:
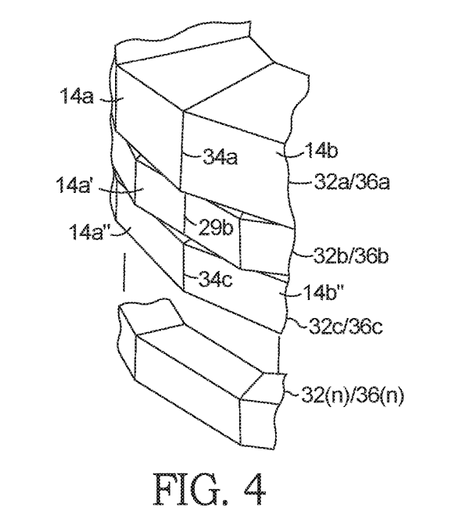
FIG. 4 is partial side perspective view of a stack of turning blanks of a uniform turning assembly in accordance with an aspect of the present invention.
Figure 5:
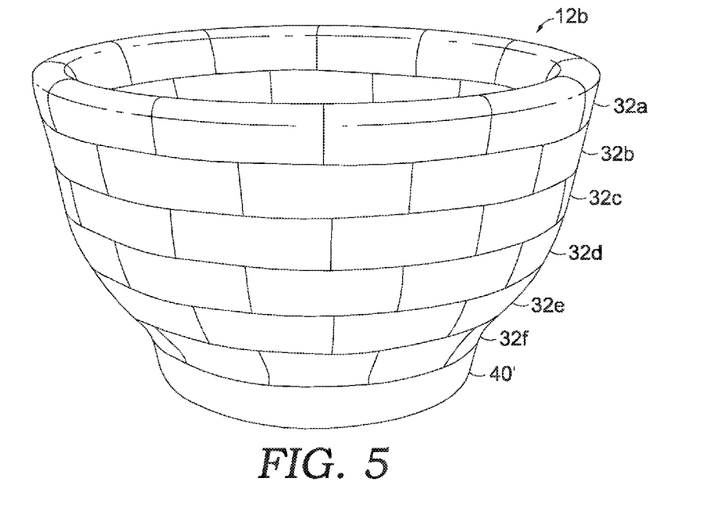
FIG. 5 is a perspective view of a further object created using a uniform turning assembly of the present invention, the object having a solid base.
Figure 6:
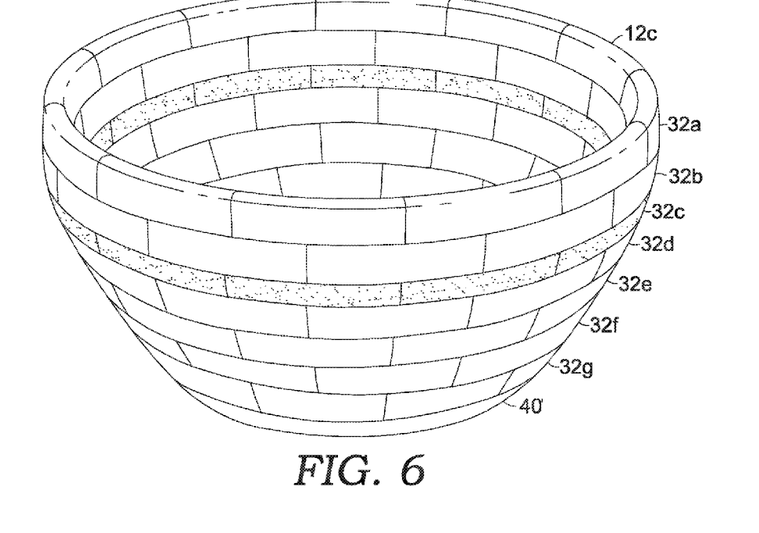
FIG. 6 is a perspective view of a further object created using a uniform turning assembly of the present invention showing the use of different materials within the object body.

In accordance with an aspect of the present invention, to form turned objects 12a-12c (FIGS. 1, 5 and 6), multiple contiguous turning blanks 32a-32(n) may be coaxially stacked upon and coupled to one another to form a joined turning blank 35. For example, successive turning blanks, such as contiguous turning blanks 32a-32c as shown in FIG. 4, may be coupled whereby contiguous turning blank 32b may be coupled to contiguous turning blank 32a such that a midline 29b of a respective block segment 14a' forming contiguous turning blank 32b coincides with adjacent joint 34a between two successive block segments 14a, 14b forming contiguous turning blank 32a. Similarly, contiguous turning blank 32c may be coupled to contiguous turning blank 32b such that joint 34c between two successive block segments 14a", 14b" of contiguous turning blank 32c coincides with adjacent midline 29b of a respective block segment of contiguous turning blank 32b. As a result, joints between block segments of adjacent turning blanks do not coincide with one another, thereby imparting a decorative element to the finished object, as well as improving the structural stability and integrity of the object by minimizing possible fracture regions.

In accordance with an aspect of the invention, respective side faces and respective top and bottom faces of the block segments and turning blanks, as appropriate, may be coupled to one another using an adhesive. Without solely limiting thereto, suitable examples of an adhesive may be an epoxy, hide glue, polyurethane glue, polymer wood glue, polyvinyl acetate based glue, elastomeric adhesive, and combinations thereof.

In accordance with an aspect of the invention, each contiguous turning blank 32a-32(n) may have a common external diameter which may assist with coaxial alignment of successive turning blanks, as well as clamping of the stacked layers when forming the joined turning blank 35. In accordance with another aspect of the invention, each of stacked contiguous turning blanks 32a-32(n) may be formed as respective turning rings 36a-36(n) having a respective central opening (such as central opening 38 in FIG. 3). In one aspect of the present invention, the central opening of each turning ring 36a-36(n) may have a common internal diameter which may also improve coaxial alignment of successive turning blanks. Alternatively, to reduce waste and turning time, each block segment 14 comprising each turning ring 36a-36(n) may include a central axis 28 having a common length L but one of a number of selected inner face widths $W_I$. In each case, however, length L is greater than width $W_I$. As a result, each turning ring 36a-36(n) may define one of any number of central opening diameters. To that end, each turning ring may be formed of a set of block segments having common dimensions. The block segments in each respective set may be coaxially aligned and coupled together to form the joined turning blank 35 as described above.

By way of example, a first set of block segments may be fabricated to form a turning blank having a nominal external diameter of four (4) inches while a second set of block segments may form a turning blank having a nominal external diameter of five (5) inches. All block segments 14 within the first set and second set may be selected to include a central axis length L of one and one-half (1.5) inches. As a result, and assuming a twelve (12) segment turning blank, the block segments within the first set would have a width $W_I$ of their inner faces equal to about 0.2679 inches while the block segments of the second set would have a width $W_I$ equal to about 0.5359 inches. Coaxially aligning and joining the first turning blank to the second turning blank as described above would permit a turner to turn an object wherein a portion of the object spanning the first turning blank may have any external diameter between about 2.5 inches and about 4 inches while the external diameter of the object spanning the second turning blank could range between about 3.5 inches and 5 inches (depending upon the desired wall thickness of the resultant turned object). It should be noted that the above examples are not meant to limit the present disclosure solely thereto, but are merely representative of possible block segments and block segment sets. Other and additional block segments and sets configured to form turning blanks of varying external diameters are fully contemplated by the present invention and are to be considered within its teachings.

Figure 7:
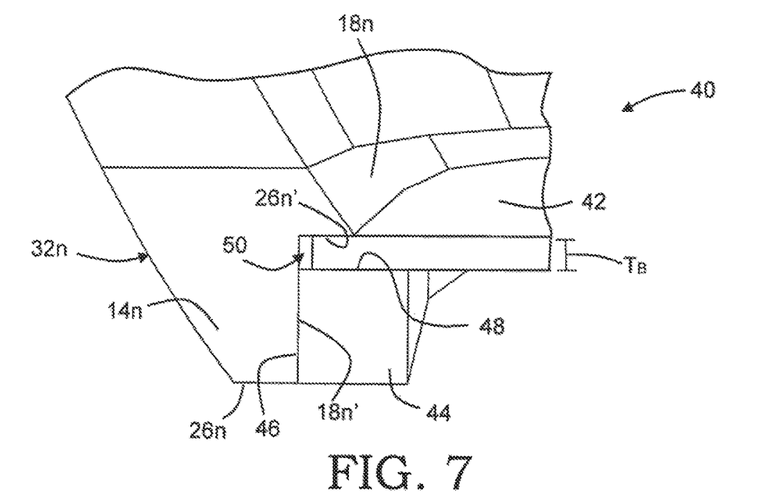
FIG. 7 is a detailed cross-section view of a floating base coupled to a turning ring in accordance with the present invention.

To form an object with at least one closed end, a base may be mounted to the external face of either or both turning ring 36a and/or turning ring 36(n) (see FIG. 4). An example of a first base 40 that may be mounted onto contiguous turning blank 32n (or 32a is desired) is shown in FIG. 7. Base 40 is a floating base as is generally known in the art of segmented turning. Base 40 includes a base panel 42 configured to float within a rabbet formed along the inner face of contiguous turning blank 32. That is, each block segment 14, such as 14n, is modified to include a stepped portion (rabbet) defined by bottom face 26n, rabbet inner face 18n', rabbet bottom face 26n' and inner face 18n. Base panel 42 is then place within the rabbet to rest against rabbet bottom face 26n'. Base panel 42 may be proportioned to overlap only a portion of rabbet bottom face 26n' so as to leave a gap G between base panel 42 and rabbet inner face 18n'. Base panel 42 also has a thickness $T_B$ that is less than the length of inner face 18n'.

A retainer ring 44 having an outer face 46 is then secured to inner face 18n' so as to capture base panel between a top face 48 of retainer ring 44 and rabbet bottom face 26n' whereby base panel 42 is free to float between the retainer ring and the turning ring. That is, floating as is generally understood by those skilled in the art means that little to no mechanical or adhesive bonding is used to secure base panel 42 to contiguous turning blank 32n. As is known in the art, a minimal amount of glue may be placed on the end grain side of the floating base panel to ensure that the orientation of the base panel is preserved. In this manner, base panel 42 is free to expand and contract within gap G, such as when exposed to a more or less humid environment which may cause wood to swell or shrink. To that end, adhesive should be applied only to those mating surfaces of outer face 46 of retainer ring 44 and rabbet inner face 18n' of block segment 14n. An example of a vessel having a floating base can be seen in FIG. 1.

Figure 8:
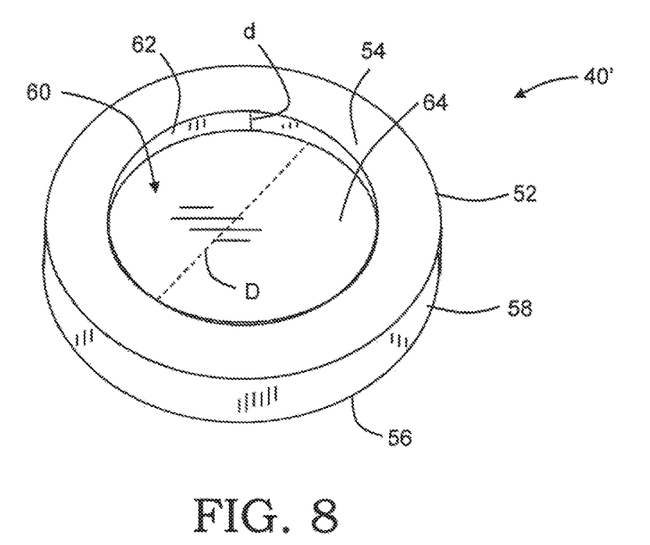
FIG. 8 is a perspective view of a solid base configured to be coupled to a turning ring in accordance with the present invention.

A second example of a base that may be mounted onto contiguous turning blank 32n and/or 32a is generally indicated by reference numeral 40' in FIG. 8. Solid base 40' may be a generally cylindrical solid body having a bottom face 54, top face 56 and thickness defined by continuous side wall 58. Top face 56 may be coupled to bottom faces 26 of block segments 14 forming contiguous turning blank 32n. Bottom face 54 may be further, optionally, configured to define a recess 60 have a recess side wall 62 defining the depth d to recess bottom face 64. Recess bottom face 64 may have a diameter D configured, along with depth d of recess side wall 62, to securely engage with jaws of common commercially available lathe chucks to securely mount the turning blank to the lathe for turning. Examples of vessels having a solid base 40' can be seen in FIGS. 5 and 6.

In contrast, individual turning blanks of prior art turning assemblies are designed to provide just enough material to be turned to the desired external diameter while having the desired wall thickness. Each block segment forming the individual turning blank layer must be separately calculated, fabricated and coupled together. As a result, designing and fabricating each block, blank and assembly is time consuming and prone to error and resultant waste. Moreover, proper alignment between successive turning blank layers is essential and may be difficult. Any improper alignment may potentially require modification of the object as it is being turned so as to avoid turning voids or holes in the final turned object.

Thus, in accordance with an aspect of the invention, each individual block segment 14 may be precisely fabricated to ensure that there are no gaps between any two successive blocks when formed into a contiguous turning blank 32. As a result of this uniformity, each block segment is interchangeable with any other block segment (of the same proportions if sets of different block segments are being used as described above). This interchangeability allows a turner to use different materials within a respective turning blank, including using different species of wood or combinations of materials such as wood and composites (see, e.g., contiguous turning blank 32c of bowl 12c in FIG. 6). As a result, decorative features may be incorporated within the final turned object with minimal potential for gaps between block segments. Interchangeability also permits a turner to keep a variety of block segments in bulk and to quickly and easily selectively assemble the turning blanks and rings as desired without demanding the complex and time consuming calculations and fabrication of each designated block segment for every individual turning blank or ring within the joined turning blank as is presently done in the art.

Figure 9:
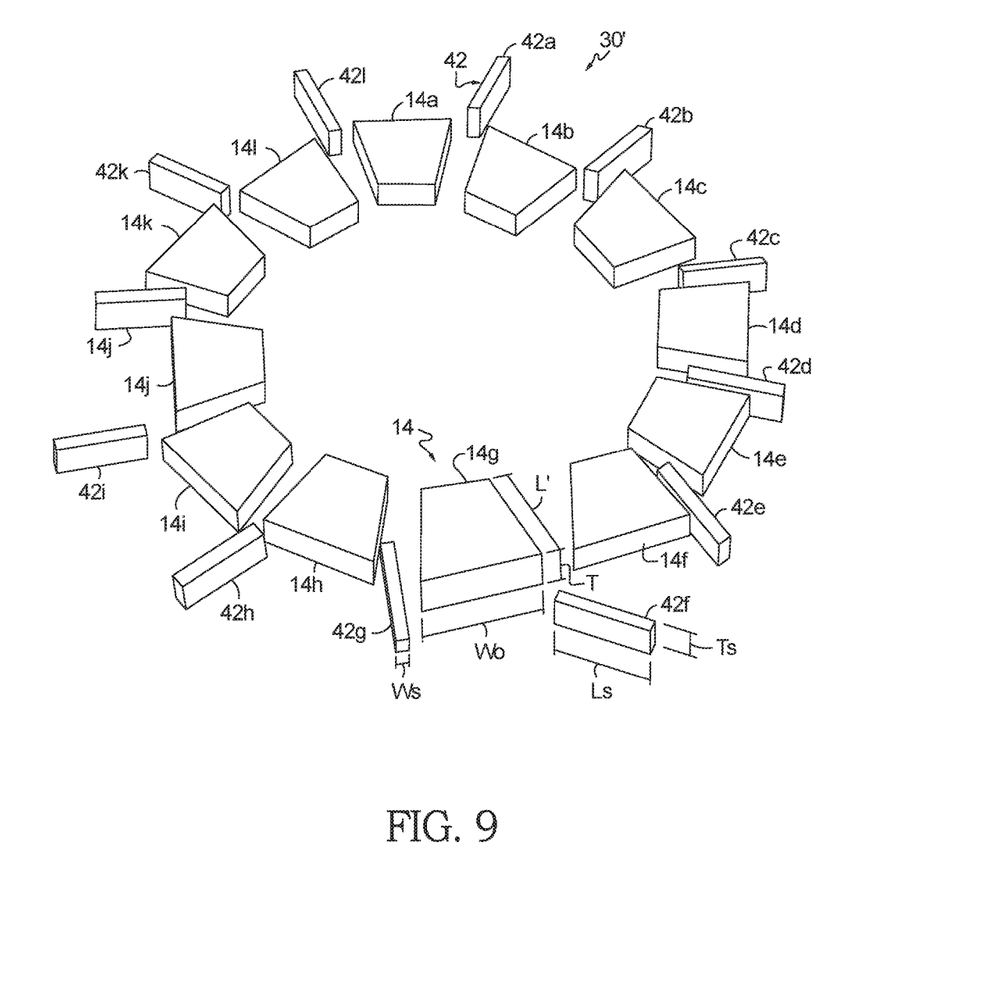
FIG. 9 is a top perspective view of a uniform turning assembly of the present invention with optional segment spacers between block segments.

Turning now to FIG. 9, in a further aspect of the invention, an alternative set 30' of interchangeable block segments 14a-14l with optional segment spacers 42a-42l is shown. Each segment spacer 42 may generally be formed as a rectangular prism having a thickness $T_S$ substantially the same as thickness T of block segment 14 and a length $L_S$ substantially the same as the length L' of block segment side wall 20, 22. Width $W_S$ of rectangular prism 42 may be any desired dimension, but is generally less than the width $W_O$ of block segment 14, and more generally less than about one half the width $W_O$. Block segments 14a-14l and segment spacers 42a-42l may be arranged in an A-B-A-B pattern wherein the segments and spacers alternate such that no two individual segments and no two individual spacers are arranged adjacent one another when forming an assembled contiguous turning blank 32'. In this manner, rectangular prisms 42 may impart a decorative feature within an assembled turning ring (as described above) while also slightly increasing the permissible maximum exterior diameter of that layer of the turned object.

Figure 10:
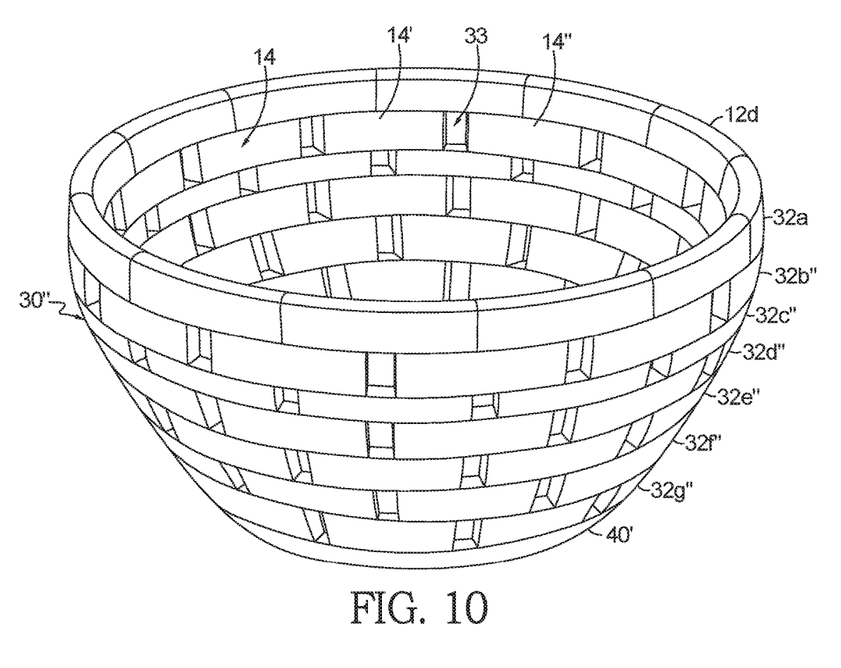
FIG. 10 is a perspective view of an object created through open segmented turning of a uniform turning assembly of the present invention.

In a further aspect of the present invention, FIG. 10 shows a perspective view of a bowl 12d created using sets 30" of interchangeable block segments 14 through a woodworking technique commonly referred to as open segmented turning. More specifically, bowl 12d may be comprised of one or more gapped turning blanks 32", such as gapped turning blanks 32b"-32g" formed from a respective set 30". Gapped turning blanks 32b"-32g" may be arranged in layers similar to contiguous turning blanks 32b-32g described above. However, whereas contiguous turning blanks 32b-32g included a plurality of block segments 14a-14l wherein each first side wall is directly coupled to the second side wall of a next successive block segment, gapped turning blanks 32b"-32g" may include a plurality of block segments 14 where each individual block segment (e.g., 14') may be arranged adjacent to, but spaced apart from, a successive block segment (e.g., 14") thereby defining an open space 33 therebetween.

As shown in FIG. 10, each successive block within a respective gapped turning blank 32b"-32g" may be spaced apart from one another such that gapped turning blank 32b"-32g" including a plurality of spaces 33. However, block segments 14 may be arranged within a turning blank so as selectively position spaces 33 therein. For instance, while shown in FIG. 10 with each block segment spaced apart from each successive block segment, it should be noted that two or more successive block segments may be directly coupled to one another to form a segment subunit, with a space 33 defined between successive segment subunits. Additionally or alternative, it should be noted that a gapped turning blank 32" may be layered above or below a contiguous turning blank 32. In this manner, the final turned object, such as bowl 12d, may be an open segmented object with spaces selectively positioned within the object. Bowl 12d may also include a solid wood base 40' and a contiguous turning blank 32a forming the brim of the bowl. It should be further noted that a floating base 40 may be included, as described above, or that the brim may be formed from a solid member similar to base 40'.

Figure 11:
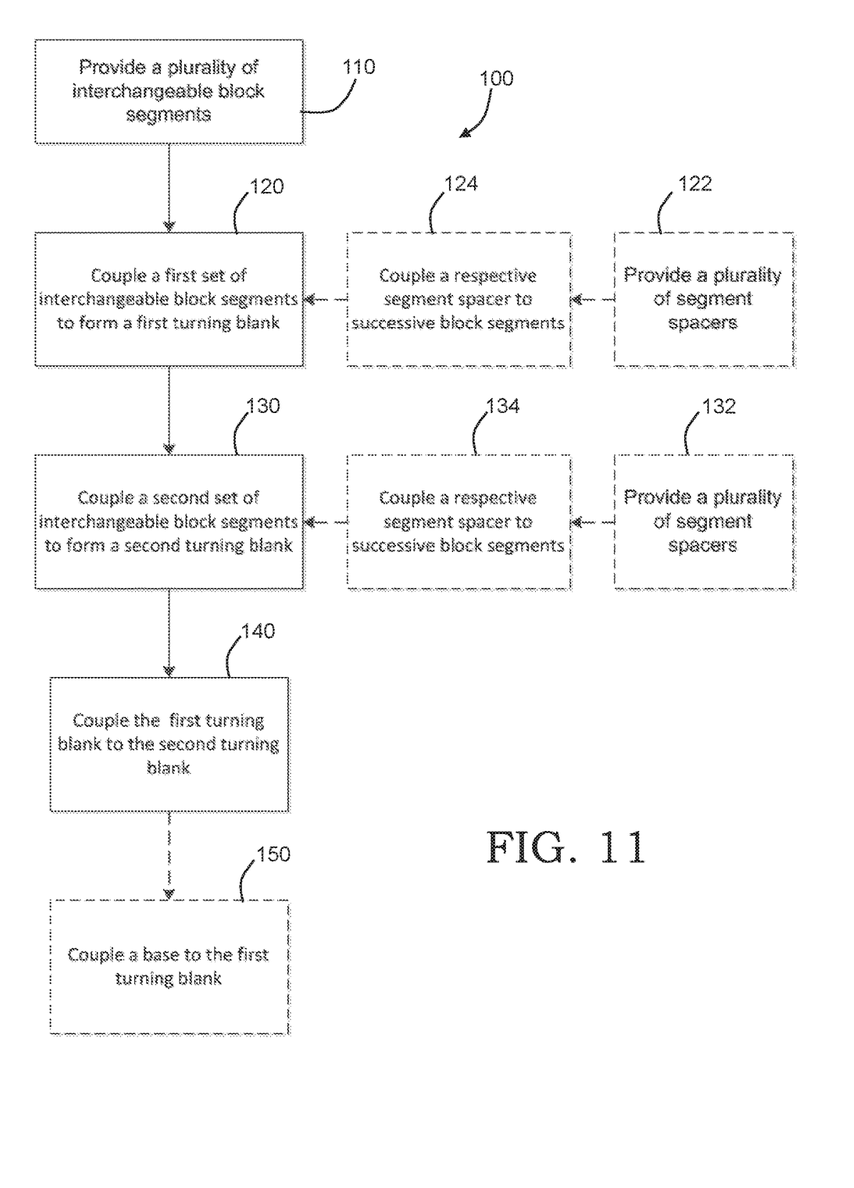
FIG. 11 is a schematic of a flow chart for forming a uniform turning assembly of the present invention.

With reference to FIG. 11, a method for forming a uniform turning assembly used to form at least a portion of a turned object is generally indicated by reference numeral 100. At step 110, a plurality of interchangeable block segments is provided. As described above, each block segment may be comprised of an isosceles prism including an outer face, an inner face, opposing first and second side faces extending between the outer face and inner face, a top face and a bottom face. The outer face includes a width that is greater than a width of the inner face and each block segment includes a radial central axis that extends between the outer face and the inner face. The central axis is perpendicular to the outer face and the inner face and a length of the central axis is greater than the width of the inner face.

At step 120, a first set of interchangeable block segments is arranged to form a first turning blank with the outer faces of the arranged block segments generally forming a regular polygon. Similarly, at step 130 a second set of interchangeable block segments is arranged to form a second turning blank with the outer faces of the arranged block segments generally forming a regular polygon. At step 140, at least of a portion of the top face of each block segment of the first turning blank is coupled to at least a portion of the bottom face of an adjacent block segment of the second turning blank to form a coupled turning blank that is configured to be formed into a portion of the turned object.

At optional step 122, a plurality of segment spacers may be provided wherein each respective segment spacer is a rectangular prism having a length equal to a length of the first inner face of each block segment. Optional step 124 includes coupling a respective segment spacer to the first side face of successive block segments within the first turning blank.

Additionally or alternatively, at optional step 132, a plurality of segment spacers may be provided wherein each respective segment spacer is a rectangular prism having a length equal to a length of the first inner face of each block segment. Optional step 134 includes coupling a respective segment spacer to the first side face of successive block segments within the second turning blank.

A further optional step 150 includes coupling of a base (such as floating base 40 or solid base 40') to the bottom face of the first turning blank opposite the second turning blank. It should be further noted that the base may be also be coupled to the first turning blank prior to the coupling of the second turning blank to the first turning blank as described above.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A uniform turning assembly configured to form at least a portion of a multitude of turned objects, the assembly comprising:
   a plurality of interchangeable universal block segments, wherein all of the block segments in the assembly consist only of isosceles prisms having the same dimensions configured to form one or more of a plurality of stackable turning blanks, each universal block segment including an outer face, an inner face, opposing first and second side faces extending between the outer face and inner face, a top face and a bottom face,
   wherein the outer face includes a width that is greater than a width of the inner face,
   wherein each of the plurality of interchangeable universal block segments include a radial central axis that extends between the outer face and the inner face, wherein the central axis is perpendicular to the outer face and the inner face, and wherein a length of the central axis is greater than the width of the inner face,
   wherein the first side face of each of the universal block segments is configured to be arranged adjacent to the second side face of another universal block segment in a side-by-side orientation to form a respective turning blank of the plurality of turning blanks with the outer faces of the interchangeable universal block segments generally forming a regular polygon, wherein the number of universal block segments comprising each respective turning blank of the plurality of turning blanks is dependent upon the dimensions of the isosceles prism, and
   wherein any universal block segment within the respective turning blank is swappable with any universal block segment within another turning blank of the plurality of turning blanks.

2. The uniform turning assembly in accordance with claim 1 wherein the length of the central axis is greater than the width of the outer face.

3. The uniform turning assembly in accordance with claim 1 wherein the first side face of each of the interchangeable universal block segments is directly coupled to the second side face of a next successive universal block segment.

4. The uniform turning assembly in accordance with claim 3 wherein a first respective turning blank is coaxially coupled to a second respective turning blank so that a joint formed by two coupled universal block segments within the second respective turning blank aligns with the central axis of an adjacent universal block forming the first respective turning blank.

5. The uniform turning assembly in accordance with claim 1 wherein the isosceles prism is an isosceles trapezoidal prism and each respective turning blank forms a respective turning ring wherein adjacent inner faces of the universal block segments forming each respective turning blank define a central opening.

6. The uniform turning assembly in accordance with claim 5 wherein each respective turning blank forms a respective turning ring, the respective turning rings coupled in a coaxial and contiguous relationship to form a tubular coupled turning blank, wherein the regular polygon of the first respective turning blank is identical in dimension to the regular polygon of the second respective turning blank, and wherein the central opening of each respective turning blank coincides with the other.

7. The uniform turning assembly in accordance with claim 1 further comprising a solid base coupled to the bottom face of each universal block segment of a first respective turning blank.

8. The uniform turning assembly in accordance with claim 1 further comprising a floating base, wherein the inner face of each universal block segment forming a first respective turning blank is configured to include a rabbet dimensioned to receive the floating base within the rabbet, and wherein the first respective turning blank further includes a retaining ring coupled to the inner face of the first respective turning blank to floatingly secure the floating base to the first respective turning blank.

9. The uniform turning assembly in accordance with claim 1 wherein a first and second universal block segment within the one or more of the respective turning blanks are arranged to define an open space therebetween.

10. The uniform turning assembly in accordance with claim 9 wherein at least a portion of the top face of a first respective turning blank is coupled to at least a portion of the bottom face of a second respective turning blank using an adhesive.

11. The uniform turning assembly in accordance with claim 1 wherein at least a portion of the top face of each of the universal block segments of a first respective turning blank is configured to be coupled to at least a portion of the bottom face of an adjacent universal block segment of a second respective turning blank to form a coupled turning blank that is configured to be formed into the portion of one of the multitude of turned objects; and wherein the respective side faces and respective top and bottom faces are coupled to one another using an adhesive.

12. The uniform turning assembly in accordance with claim 1 further comprising a plurality of rectangular prism segment spacers, wherein a respective segment spacer of the plurality of segment spacers is configured to be disposed between adjacent universal block segments in one or more of the respective turning blanks.

13. The uniform turning assembly in accordance with claim 12 wherein each rectangular prism has a length equal to a length of the first side face of each of the plurality of interchangeable block segments.

14. A method for forming a uniform turning assembly from an assembly configured to form at least a portion of a multitude of turned objects, the method comprising:
a) providing a plurality of interchangeable universal block segments, wherein all of the block segments in the assembly consist only of isosceles prisms having the same dimensions configured to form one or more of a plurality of stackable turning blanks, each universal block segment including an outer face, an inner face, opposing first and second side faces extending between the outer face and inner face, a top face and a bottom face, wherein the outer face includes a width that is greater than a width of the inner face, and wherein each of the plurality of interchangeable universal block segments include a radial central axis that extends between the outer face and the inner face, wherein the central axis is perpendicular to the outer face and the inner face, and wherein a length of the central axis is greater than the width of the inner face;
b) arranging the interchangeable universal block segments to form a respective turning blank of the plurality of turning blanks with the outer faces of the arranged interchangeable universal block segments generally forming a regular polygon, wherein the first side face of each of the block segments is configured to be arranged adjacent to the second side face of another universal block segment in a side-by-side orientation wherein the number of universal block segments comprising each respective turning blank of the plurality of turning blanks is dependent upon the dimensions of the isosceles prism;
wherein any universal block segment within the respective turning blank is swappable with any universal block segment within another of the turning blanks of the plurality of turning blanks.

15. The method in accordance with claim 14 wherein the length of the central axis is greater than the width of the outer face.

16. The method in accordance with claim 14 wherein the first side face of each of the interchangeable universal block segments is directly coupled to the second side face of a next successive universal block segment.

17. The method in accordance with claim 16 further comprising the step of:
c) coupling the top face of a first respective turning blank to the bottom face of a second respective turning blank to form a coupled turning blank that is configured to be formed into a portion of one of the multitude of turned objects,
wherein the second respective turning blank is coaxially coupled to the first respective turning blank so that a joint formed by two coupled universal block segments within the second respective turning blank aligns with the central axis of an adjacent universal block forming the first respective turning blank.

18. The method in accordance with claim 17 wherein the respective side faces and respective top and bottom faces are coupled to one another using an adhesive.

19. The method in accordance with claim 14 wherein the isosceles prism is an isosceles trapezoidal prism and wherein each respective turning blank forms a respective turning ring wherein adjacent inner faces of the universal block segments comprising each respective turning blank define a central opening.

20. The method in accordance with claim 19 each respective turning blank forms a respective turning ring, the respective turning rings coupled in a coaxial and contiguous relationship to form a tubular coupled turning blank, wherein the regular polygon of a first respective turning blank is identical in dimension to the regular polygon of a second respective turning blank, and wherein the central opening of each respective turning blank coincides with the other.

21. The method in accordance with claim 14 further comprising the step of coupling a solid base to the bottom face of a first respective turning blank.

22. The method in accordance with claim 14 wherein each of the inner faces of the interchangeable universal block segments within a first respective turning blank is configured to include a rabbet wherein upon arranging the first set of universal block segments to form the first respective turning blank the arranged rabbets form a rabbeted recess, wherein the method further comprises:
c) receiving a floating base within the rabbeted recess; and
d) coupling a retaining ring to the inner face of the first respective turning blank to floatingly secure the floating base to the first turning blank.

23. A method for forming a uniform turning assembly using an assembly configured to form at least a portion of a multitude of turned objects, the method comprising:
a) providing a plurality of interchangeable universal block segments, wherein all of the block segments in the assembly consist only of isosceles prisms having the same dimensions configured to form one or more of a plurality of stackable turning blanks, each universal block segment including an outer face, an inner face, opposing first and second side faces extending between the outer face and inner face, a top face and a bottom face, wherein the outer face includes a width that is greater than a width of the inner face, and wherein each of the plurality of interchangeable universal block segments include a radial central axis that extends between the outer face and the inner face, wherein the central axis is perpendicular to the outer face and the inner face, and wherein a length of the central axis is greater than the width of the inner face;
b) providing a plurality of segment spacers, wherein each segment spacer is a rectangular prism having a length equal to a length of the first side face of each of the plurality of interchangeable universal block segments;
c) coupling the interchangeable universal block segments to form a respective turning blank of the plurality of turning blanks, wherein the outer faces of the arranged interchangeable universal block segments generally form a regular polygon; and d) disposing a respective segment spacer between adjacent universal block segments within the respective turning blank to form a respective expanded turning blank;

wherein any universal block segment within the respective turning blank is swappable with any universal block segment within another turning blank of the plurality of turning blanks.

24. The method in accordance with claim 23 further comprising the step of coupling a solid base to the bottom face of a first respective turning blank.

25. The method in accordance with claim 23 wherein segments spacers are not disposed between adjacent universal block segments in a first respective turning blank and wherein each of the inner faces of the interchangeable universal block segments within the first respective turning blank is configured to include a rabbet wherein upon coupling of the first set of universal block segments to form the first respective turning blank the rabbets form a rabbeted recess, wherein the method further comprises:

e) receiving a floating base within the rabbeted recess; and f) coupling a retaining ring to the inner face of the first respective turning blank to floatingly secure the floating base to the first respective turning blank.

26. The method in accordance with claim 23 wherein segments spacers are disposed between adjacent universal block segments in a first respective turning blank and wherein each of the inner faces of the interchangeable universal block segments within the first respective turning blank and each segment spacer is configured to include a rabbet wherein upon coupling of the universal block segments within the first respective turning blank and segment spacers to form a first expanded turning blank, the rabbets form an expanded rabbeted recess, wherein the method further comprises:

e) receiving a floating base within the expanded rabbeted recess; and f) coupling a retaining ring to the inner face of the first expanded turning blank to floatingly secure the floating base to the first expanded turning blank.

* * * * *